(12) United States Patent
Kim et al.

(10) Patent No.: US 9,294,706 B2
(45) Date of Patent: Mar. 22, 2016

(54) METHOD AND APPARATUS FOR PLAYING BACK A MOVING PICTURE

(71) Applicant: Samsung Electronics Co., Ltd., Gyeonggi-do (KR)

(72) Inventors: Kwang-Tai Kim, Gyeonggi-do (KR); Jae-Hyeon Kang, Gyeonggi-do (KR); Yo-Han Lee, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 76 days.

(21) Appl. No.: 14/137,882

(22) Filed: Dec. 20, 2013

(65) Prior Publication Data

US 2014/0178044 A1 Jun. 26, 2014

(30) Foreign Application Priority Data

Dec. 20, 2012 (KR) .................. 10-2012-0149526

(51) Int. Cl.
*H04N 5/92* (2006.01)
*H04N 5/445* (2011.01)
*H04N 5/76* (2006.01)
*H04N 5/783* (2006.01)
*H04N 21/414* (2011.01)
*H04N 21/431* (2011.01)
*H04N 21/44* (2011.01)
*H04N 21/472* (2011.01)
*H04N 21/482* (2011.01)
*H04N 21/485* (2011.01)

(52) U.S. Cl.
CPC .................. *H04N 5/445* (2013.01); *H04N 5/76* (2013.01); *H04N 5/783* (2013.01); *H04N 21/41407* (2013.01); *H04N 21/4312* (2013.01); *H04N 21/44008* (2013.01); *H04N 21/44016* (2013.01); *H04N 21/47217* (2013.01); *H04N 21/485* (2013.01); *H04N 21/4825* (2013.01)

(58) Field of Classification Search
CPC ............ H04N 21/485; H04N 21/4825; H04N 21/47217; H04N 21/41407; H04N 21/44008; H04N 21/44016; H04N 21/4312; H04N 5/445; H04N 5/76; H04N 5/783
USPC .................................................. 386/243, 248
See application file for complete search history.

(56) References Cited

U.S. PATENT DOCUMENTS

| | | | |
|---|---|---|---|
| 6,100,941 A | 8/2000 | Dimitrova et al. | |
| 6,466,731 B2 | 10/2002 | Aoki et al. | |
| 2006/0129822 A1* | 6/2006 | Snijder et al. ................. | 713/176 |
| 2008/0036917 A1* | 2/2008 | Pascarella et al. ............ | 348/702 |
| 2009/0177674 A1* | 7/2009 | Yoshida ........................ | 707/100 |

(Continued)

FOREIGN PATENT DOCUMENTS

| | | |
|---|---|---|
| EP | 2362396 A2 | 8/2011 |
| KR | 10-2009-0014754 | 2/2009 |

*Primary Examiner* — William Tran

(57) ABSTRACT

A method of playing back a moving picture in a portable terminal includes recognizing at least one playback list including moving picture files having file names that are more similar than a determined degree from among all moving picture files, identifying at least one overlap playback section formed of identical frames by analyzing frames of moving picture files included in the generated playback list, and upon playing one of the moving picture files included in the generated playback list, determining whether an auto-skipping function is activated, and playing the requested one of moving picture files based on the determination.

20 Claims, 6 Drawing Sheets

(56) References Cited

U.S. PATENT DOCUMENTS

| | | | |
|---|---|---|---|
| 2010/0158101 A1* | 6/2010 | Wu et al. | 375/240.01 |
| 2010/0211968 A1* | 8/2010 | Itskov et al. | 725/25 |
| 2011/0167347 A1* | 7/2011 | Joo et al. | 715/716 |

* cited by examiner

METHOD AND APPARATUS FOR PLAYING BACK A MOVING PICTURE

CROSS-REFERENCE TO RELATED APPLICATION(S) AND CLAIM OF PRIORITY

The present application is related to and claims the priority under 35 U.S.C. §119(a) to Korean Application Serial No. 10-2012-0149526, which was filed in the Korean Intellectual Property Office on Dec. 20, 2012, the entire content of which is hereby incorporated by reference.

TECHNICAL FIELD

The present disclosure relates generally to playback of a moving picture in a portable terminal, and more particularly, to playback of a moving picture by automatically skipping overlap sections from a plurality of associated moving pictures.

BACKGROUND

Portable terminals have been advanced to varied forms such as smart phones or tablets or the like, and have provided various functions to users leading to the popularization of portable terminals. Particularly, users often use portable terminals for playing back multi-media (e.g., playback of a moving picture file).

Users utilize a moving picture purchased from a content provider and the like, and examples of moving picture files that are popular among users may include dramas or animations.

However, most dramas or animations correspond to a series that forms a season with a series of moving pictures (e.g., episodes). For example, a drama named "Game of Thrones" forms a season with a total of 10 moving picture files (e.g., 10 episodes).

When a playback section of a moving picture is classified into an opening moving picture, a main moving picture, and a closing moving picture, a main moving picture (a portion that is actually desired to be viewed) of a moving picture file corresponding to a series is different for each episode and thus, overlap does not exist.

However, an opening moving picture and a closing moving picture provide information associated with a producer, actors, and the like and thus, a probability that opening moving pictures and closing moving pictures of moving picture files corresponding to a series are identical is high.

Therefore, when a user views moving picture files corresponding to a series in serial order, the user may redundantly view openings moving pictures and closing moving pictures that include overlap. To avoid this, the user needs to inconveniently manually skip the opening moving pictures and the closing moving pictures that include overlap.

For example, when moving picture 1 and moving picture 2 are series moving picture files and moving picture 2 is viewed after moving picture 1, the user needs to manually skip, from moving picture 2 which is being played back, an opening moving picture that overlaps an opening moving picture of moving picture 1 so as to view the main moving picture of moving picture 2.

Therefore, there is a desire for a method and apparatus that may promptly and conveniently play back a moving picture of each file without manipulation by the user when moving picture files corresponding to a series are played back (or viewed), so that a moving picture may be readily played back in a portable terminal.

SUMMARY

To address the above-discussed deficiencies of the prior art, it is a primary object to provide a method and apparatus that may play back a moving picture by automatically skipping an overlapping moving picture playback section (e.g., an opening moving picture and a closing moving picture) when moving picture files corresponding to a series are played back (or viewed).

In accordance with another aspect of the present disclosure, a method of playing back a moving picture in a portable terminal is provided. The method includes recognizing at least one playback list including moving picture files having file names that have higher similarities than a determined degree, identifying at least one overlap play section formed of identical frames by analyzing frames of moving picture files included in the generated playback list, and upon playing one of the moving picture files included in the generated playback list, determining whether an auto-skipping function is activated.

In accordance with another aspect of the present disclosure, an apparatus for playing back a moving picture in a potable terminal is provided. The apparatus includes a memory configured to store at least one moving picture file, and a controller configured to generate at least one playback list formed of moving picture files having file names that have higher similarities than a determined degree from among moving picture files stored in the memory, to identify at least one overlap play section formed of identical frames by analyzing frames of moving picture files included in the generated playback list, and to determine whether an auto-skipping function is activated and to play back one of the moving picture files.

According to embodiments of the present disclosure, a user may view a moving picture file by automatically skipping an overlapping moving picture, such as an opening moving picture and a closing moving picture that the user is obliged to redundantly view.

According to an embodiment of the present disclosure, existence or a location of an overlap playback section that overlaps another moving picture file is visually displayed when a moving picture file is played back and a user may conveniently select whether to skip the overlap playback section.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Hereinafter, various embodiments of the present disclosure will be described with reference to the accompanying drawings.

Figure 1:
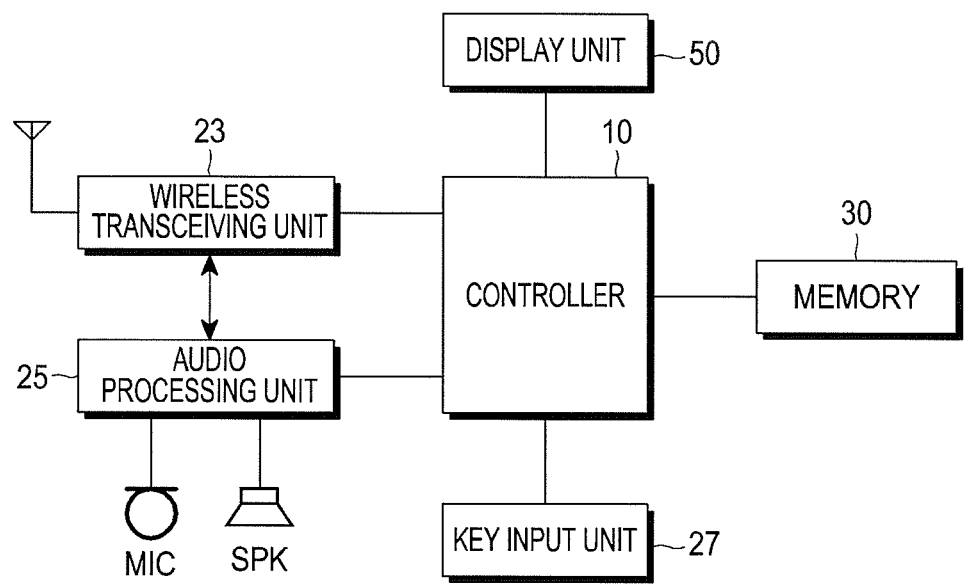
FIG. 1 is a schematic block diagram illustrating a portable terminal according to an embodiment of the present disclosure.

FIG. 1 is a schematic block diagram illustrating a portable terminal according to an embodiment of the present disclosure.

The portable terminal according to an embodiment of the present disclosure is assumed to be a portable electronic device in terms of weight and size.

Examples of the portable terminal according to an embodiment of the present disclosure include a conventional feature phone and an electronic device (e.g., a smart phone and a tablet) operating based on an operating system such as bada, Tizen, Windows (e.g., Windows 8), iOS, Android, and the like. In addition, the portable terminal according to an embodiment of the present disclosure corresponds to a portable notebook, a digital camera, a video telephone, or the like. In this example, it is apparent to those skilled in the art that the portable terminal according to an embodiment of the present disclosure is not limited to the above-mentioned devices.

A wireless transceiving unit 23 can include an RF unit and a modem. The RF unit can include an RF transmitter to up-convert and to amplify a frequency of a transmitted signal, an RF receiver to low-noise amplify a received signal and to down-convert a frequency, and the like. The modem can include a transmitter to encode and modulate a signal to be transmitted, a receiver to decode and demodulate a signal received from the RF unit, and the like. In this example, it is apparent to those skilled in the art that a short-distance communication module such as a Wi-Fi module and the like can supplement a function of the wireless transceiving unit 23 or can be substituted for the function.

An audio processing unit 25 can form a codec, and the codec can include a data codec and an audio codec. The data codec can process packet data and the like, and the audio codec can process an audio signal such as a voice file, multimedia file, and the like. The audio processing unit 25 can convert a digital audio signal received from the modem into an analog signal through use of the audio codec so as to play back the signal, or can convert an analog audio signal generated from a microphone into a digital audio signal through use of the audio codec so as to transmit the signal to the modem. The codec of the audio processing unit 25 can be separately included or can be included in a controller 210, or the audio processing unit 25 can be included in the controller 10.

A key input unit 27 can include keys required for inputting number and character information, function keys required for setting various functions, a touch pad, and the like. When a display unit 50 is embodied to be a touch screen type, the key input unit 27 can include a minimum number of predetermined keys, and the display unit 50 can be substituted for a part of a key input function of the key input unit 27.

A user can manually set an auto-skipping function to be activated or inactivated through a call or a LongKey function of a separate menu, using the key input unit 27 according to an embodiment of the present disclosure.

A memory 30 can include a program memory and a data memory. Here, the program memory can store a program for controlling a general operation of the portable terminal. The memory 30 can further include an external memory such as a Compact Flash (CF) memory, a Secure Digital (SD) memory, a Micro Secure Digital (Micro-SD) memory, a Mini Secure Digital (Mini-SD) memory, an Extreme Digital (xD) memory, a memory stick, and the like. Also, the memory 30 can include a disk storage device such as a Hard Disk Drive (HDD), a Solid State Disk (SSD), and the like.

The memory 30 according to an embodiment of the present disclosure stores moving picture files obtained through varied routes such as a moving picture file captured by a camera module (not illustrated) or a moving picture obtained from a Contents Provider (CP).

For example, the memory 30 according to an embodiment of the present disclosure stores a series forming a season with a series of moving pictures (e.g., episodes) such as dramas or animations. In this example, the series corresponds to moving picture files that are associated with each other in a season such as episode 1, episode 2, episode 3, and the like, and indicates moving picture files of which opening moving pictures and closing moving pictures include overlaps.

The display unit 50 can be formed of a Liquid Crystal Display (LCD), an Organic Light Emitting Diodes (OLED) such as a PMOLED or an AMOLED, or the like, and can output various display information generated in the portable terminal. The display unit 50 can include a touch screen, for example, a capacitive touch screen, a resistive touch screen, or the like, and a user can manipulate a portable terminal (e.g., touching a button) by solely using the display unit 50 or using the display unit 50 together with the key input unit 40. Also, the display unit 50 can include a digitizer together with a touch screen.

The controller 10 according to an embodiment of the present disclosure can perform controlling to display a moving picture file of which playback is requested through the display unit 50. Also, the user can control playback of a moving picture file that is being played back through the display unit 50 according to an embodiment of the present disclosure, such as changing a playback position by dragging a displayed progress bar.

The controller 10 can control a general operation of the portable terminal, and can convert and control an operation of the portable terminal based on a user's input entered through the key input unit 27, the display unit 50, or the like. The controller 10 according to an embodiment of the present disclosure can control a series of operations associated with processes of generating at least one playback list formed of moving picture files having file names that are more similar than a determined degree from among all moving picture files stored in the memory, identifying at least one overlap playback section formed of identical frames by analyzing frames of moving picture files included in the generated playback list, and determining whether an auto-skipping function is activated and playing back a moving picture file of which playback is requested when playback of one of the moving picture files included in the generated playback list is requested. Detailed operations of the controller 10 according to an embodiment of the present disclosure will be provided in detail in the following descriptions.

Although devices, such as a Bluetooth module, a camera module, a Wi-Fi module, an acceleration sensor, a proximity sensor, a geomagnetic sensor, a Digital Media Broadcasting (DMB) receiver, and the like, can be included in the portable terminal but are not illustrated in FIG. 1, it is apparent to those skilled in the art that these devices can be included in the portable terminal and can provide corresponding functions.

A moving picture file stored in the memory 30 according to an embodiment of the present disclosure can correspond to a moving picture file that includes an opening moving picture and a closing moving picture having an overlap by separate editing and the like after being captured by a camera module.

A moving picture file stored in the memory 30 according to an embodiment of the present disclosure can correspond to a moving picture file that is obtained by recording broadcasts (e.g., episode 1 and episode 2 of "Dexter" Season 1) that are received through a DMB, a DVB-H receiver, or the like and is stored.

Figure 2:
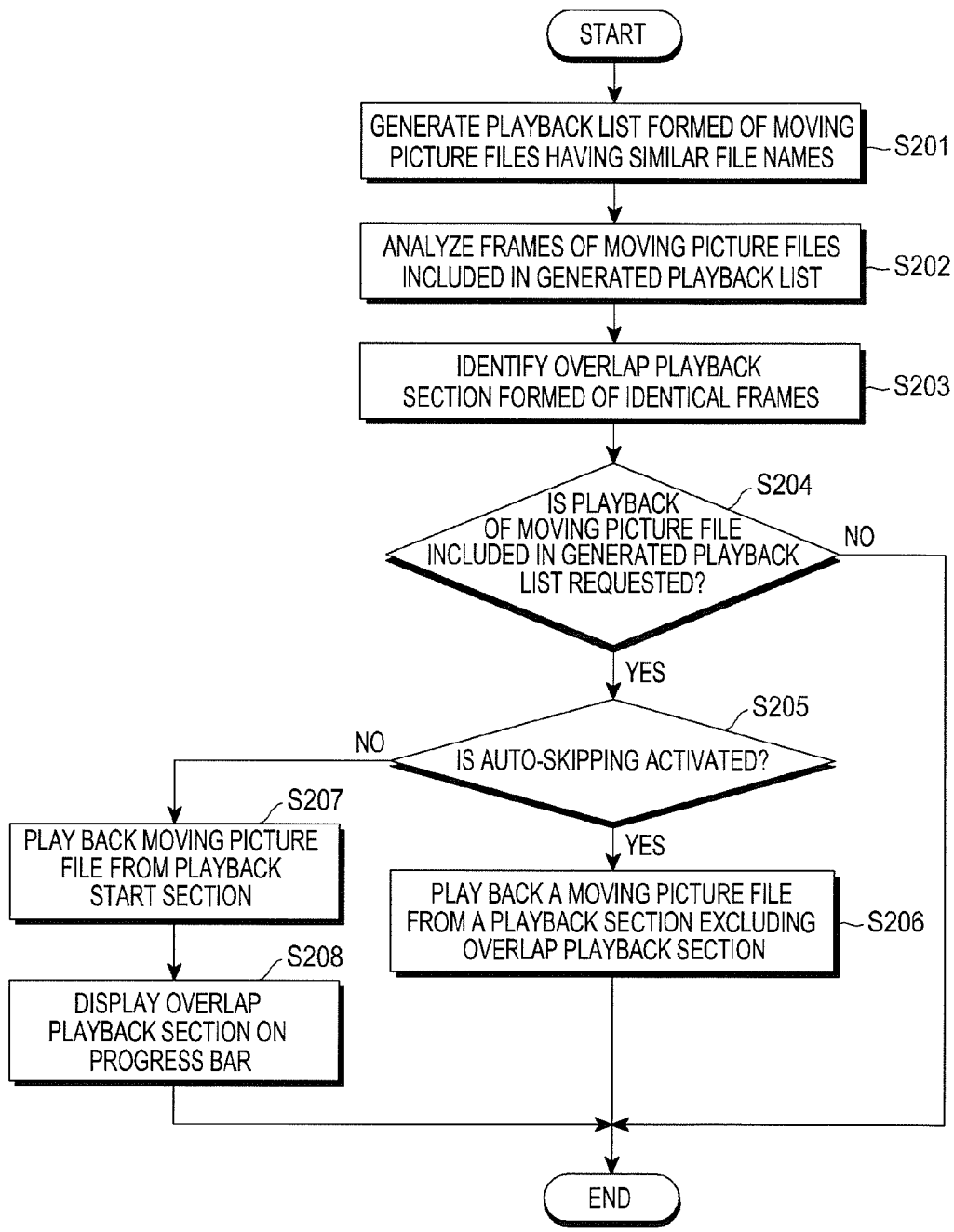
FIG. 2 is a flowchart illustrating a process of playing back a moving picture in a portable terminal according to an embodiment of the present disclosure.

FIG. 2 is a flowchart illustrating a process of playing back a moving picture in a portable terminal according to an embodiment of the present disclosure. FIGS. 3 through 6 are diagrams illustrating first, second, third, and fourth examples of a process of playing back a moving picture in a portable terminal according to an embodiment of the present disclosure. With reference to the related drawings, an embodiment of the present disclosure will be described as follows.

In steps S201 through S203, the controller 10 performs a control to generate at least one playback list foamed of moving picture files having file names more similar than a determined degree from among all moving picture files, and to identify at least one overlap playback section formed of identical frames by analyzing moving picture files included in the generated playback list.

Figure 3:
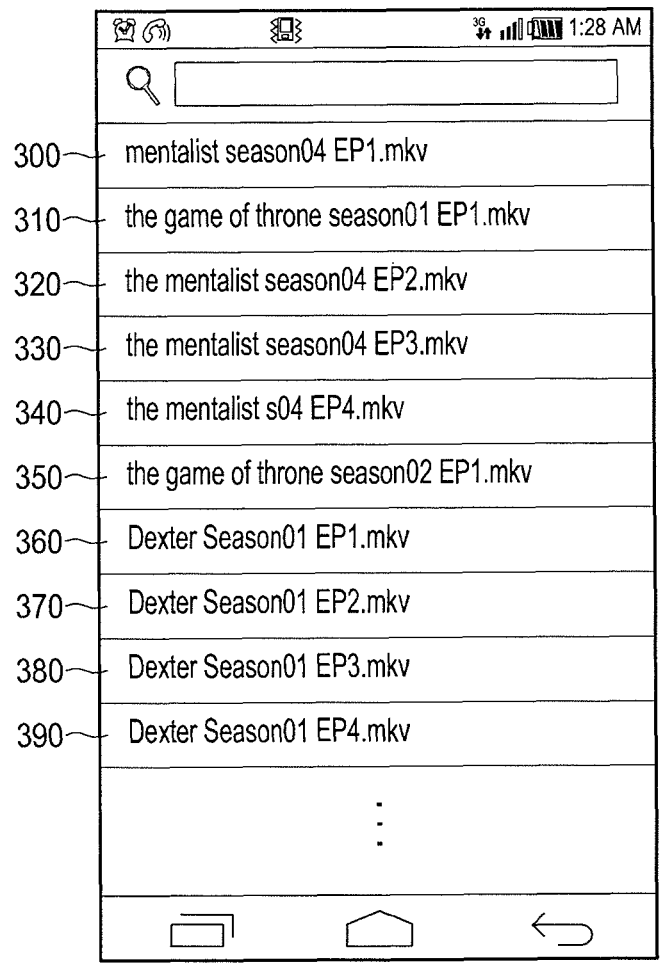
FIG. 3 is a diagram illustrating an example process of playing back a moving picture in a portable terminal according to an embodiment of the present disclosure.

Referring to FIG. 3, FIG. 3 illustrates an example where a list of moving picture files 300 through 390 stored in the memory 30 of a portable terminal is displayed. Here, displaying a list of moving picture files as illustrated in FIG. 3 can be triggered when displaying of the list of the moving picture files is requested, playback of a moving picture file is requested, or an application for playing back a moving picture file is executed.

The moving picture files 300 through 390 of FIG. 3 illustrate examples of a plurality of series moving picture files.

Moving picture files 300, 320, 330, and 340 illustrate moving picture files having file names that are not identical but are more similar than a determined degree (e.g, when having file names with text that are more than 70% identical). The controller 10 can analyze file names of the moving picture files 300, 320, 330, and 340, can determine that the file names are more similar than a determined degree, and can determine that the moving picture files 300, 320, 330, and 340 correspond to a series named "Mentalist" based on similarity.

Moving picture files 310 and 350 illustrate moving picture files having file names that are more similar than a determined degree. Therefore, the controller 10 can analyze file names of the moving picture files 310 and 350, and can determine that the moving picture files 310 and 350 correspond to a series named "Game of Thrones."

Also, moving picture files 360, 370, 380, and 390 illustrate examples of moving picture files having file names that are more similar than a determined degree. Therefore, the controller 10 can analyze file names of the moving picture files 360, 370, 380, and 390, and can determine that the moving picture files 360, 370, 380, and 390 correspond to a series named "Dexter."

As described in the foregoing, when moving picture files having file names that are more similar than a determined degree are determined by analyzing file names of moving picture files stored in the portable terminal, the controller 10 can determine those files to be series moving picture files.

In an embodiment of the present disclosure, the controller 10 can generate a playback list formed of moving picture files (i.e., moving picture files determined to be series moving picture files) having file names that are more similar than a determined degree.

Figure 4:
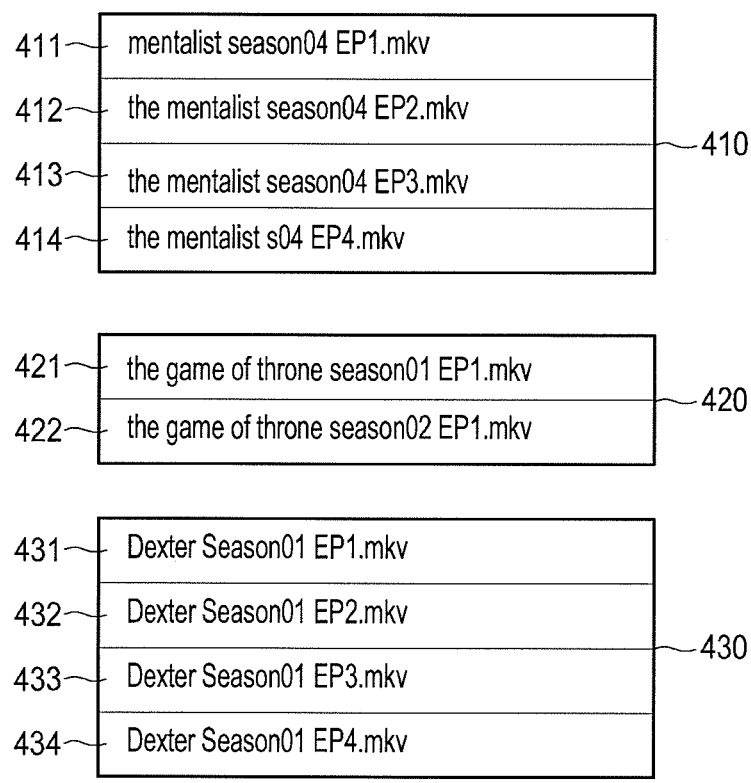
FIG. 4 is a diagram illustrating another example of a process of playing back a moving picture in a portable terminal according to an embodiment of the present disclosure.

FIG. 4 illustrates an example of additionally generated playback lists formed of moving picture files having file names that are more similar than a determined degree that has been described with reference to FIG. 3.

A playback list 410 is formed of moving picture files 300 and 320 through 340 of FIG. 3 corresponding to moving picture files 411 through 414, and corresponds to a playback list of moving picture files corresponding to a series named "Mentalist."

Also, a playback list 420 is formed of moving picture files 310 and 350 of FIG. 3 corresponding to moving picture files 421 and 422, and corresponds to a playback list of moving picture files corresponding to a series named "Game of Thrones."

Also, a playback list 430 is formed of moving picture files 360 through 390 of FIG. 3 corresponding to moving picture files 431 through 434, and corresponds to a playback list of moving picture files corresponding to a series named "Dexter."

In this example, respective playback lists 410, 420, and 430 of FIG. 4 can be displayed or not be displayed separately to a user, based on display settings (e.g., based on a request of a user), For example, playback lists 410, 420, and 430 can be executed as a background job (while the controller 10 displays a list of moving picture files stored in the portable terminal as illustrated in FIG. 3) and thus, the user cannot recognize generation of a playback list as illustrated in FIG. 4. That is, the controller 10 can perform a control to display the playback list of FIG. 3, to generate the playback lists 410, 420, and 430 but not to display the playback lists, so that the user can determine only the playback list of FIG. 3.

After displaying the playback list of FIG. 3, the controller 10 can perform a control to inform the user of generation of the playback lists of FIG. 4, and to display the playback lists 410, 420, and 430 of FIG. 4 when it is requested by the user.

When moving picture files having file names that are more similar than a determined degree (i.e., series moving picture files) are determined and a playback list is generated, the controller 10 performs a control to identify at least one overlap playback section formed of overlapping (identical or similar) frames by analyzing frames associated with moving picture files included in the generated playback list.

Figure 5:
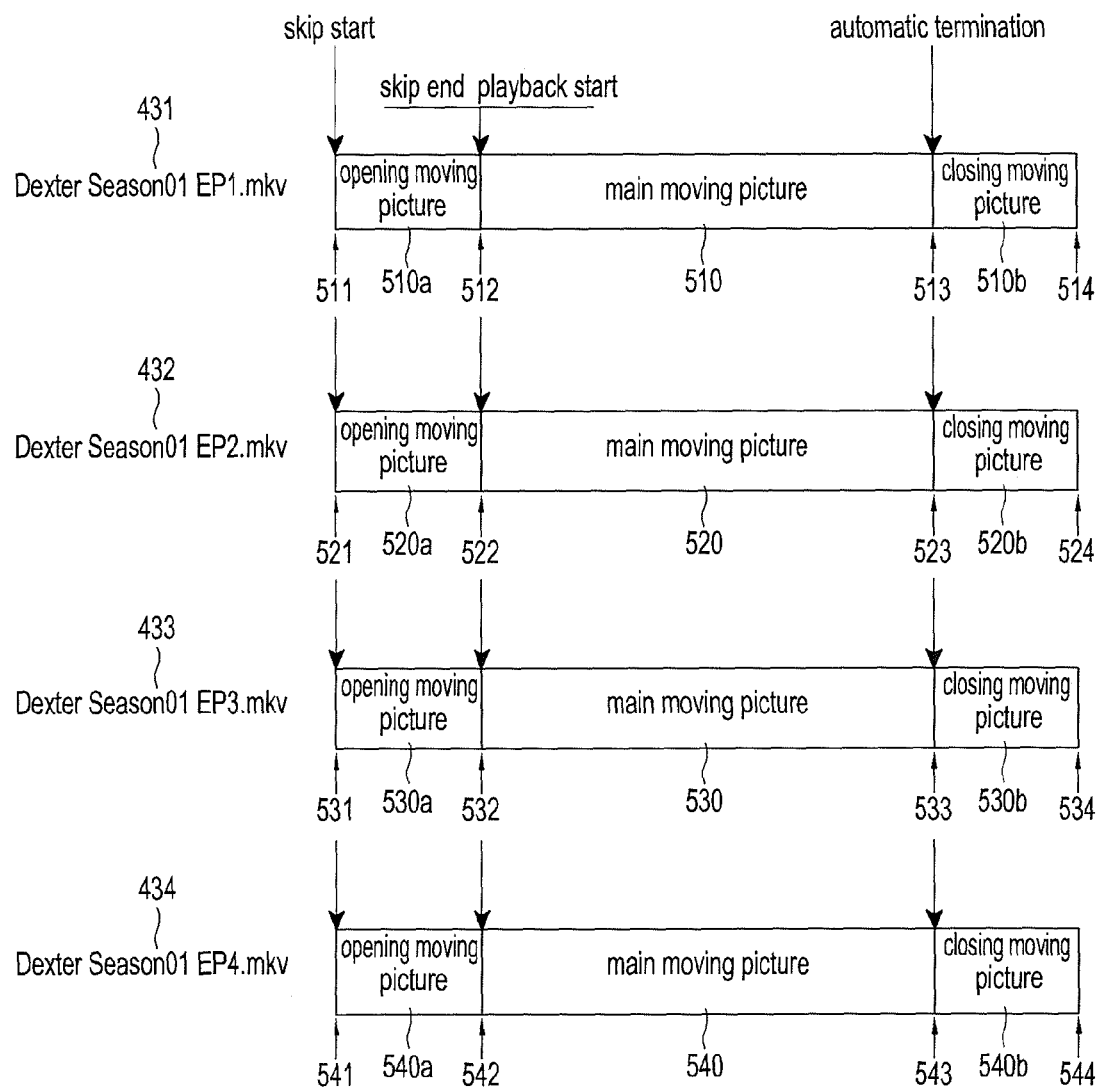
FIG. 5 is a diagram illustrating yet another example of a process of playing back a moving picture in a portable terminal according to an embodiment of the present disclosure.

FIG. 5 illustrates playback sections of moving picture files corresponding to the playback list 430 of FIG. 4.

Referring to FIG. 5, the moving picture file 431 is formed of an entire playback section from point 511 to point 514 including an opening moving picture 510a, a main moving picture 510, and a closing moving picture 510b. The moving picture file 432 is formed of an entire playback section from point 521 to point 524 including an opening moving picture 520a, a main moving picture 520, and a closing moving picture 520b. The moving picture file 433 is formed of an entire playback section from point 531 to point 534 including an opening moving picture 530a, a main moving picture 530, and a closing moving picture 530b. The moving picture file 434 is formed of an entire playback section from point 541 to point 544 including an opening moving picture 540a, a main moving picture 540, and a closing moving picture 540b.

The moving picture files 431, 432, 433, and 434 that have been described with reference to FIGS. 3 and 4 are moving picture files corresponding to episode 1 through episode 4 of season 1 of a drama named "Dexter." Also, it has been described that the controller 10 determines that the moving picture files correspond to series moving picture files by determining that the file names of the moving picture files are more similar than a determined degree.

The moving picture files 431, 432, 433, and 434 are series moving picture files and thus, main moving pictures 510, 520, 530 and 540 corresponding to main stories are different from each other and may not overlap each other, but have a high probability that their opening moving pictures and closing moving pictures overlap each other.

Therefore, the controller 10 according to an embodiment of the present disclosure can analyze frames of the moving picture files 431 through 434, and can identify, from an entire playback section of each moving picture file, an overlap playback section that overlaps another moving picture file included in the series moving picture files.

As illustrated in FIG. 5, in an embodiment of the present disclosure, it is assumed that the controller 10 identifies that 510a, 520, 530a, and 540a overlap each other and that 510b, 520b, 530b, and 540b overlap each other as overlap playback sections of the moving picture files 431 through 434.

In steps S204 through S206, when playback of one of the moving picture files included in a playback list is requested, the controller 10 performs a control to determine whether an auto-skipping function is activated, and to play back a moving picture file from a playback section excluding an overlap playback section when the auto-skipping function is activated.

When playback of one of the moving picture files included in one of the playback lists 410 through 430 is requested, it can be understood that playback of one of the moving picture files corresponding to series moving picture files is requested. For example, the user can request playback of one of the moving picture files 431 through 434 in the playback list 430 (e.g., by touching a corresponding moving picture file).

In an embodiment of the present disclosure, it has been described that generation of the playback lists 410 through 430 are executed as a background job and the playback lists are not displayed to the user. Accordingly, the user can request playback of one of the moving picture files in the playback list of FIG. 3. In this example, through execution as a background job, a playback list is generated that is formed of a moving picture file of which playback is requested by the user and moving picture files having file names similar to the requested file more than a determined degree, and an overlap playback section is identified and thus, the controller 10 can perform the step previously described with reference to FIG. 2 and a step to be described as follows, although the user requests playback of a predetermined file in the playback list of FIG. 3 or the playback list of FIG. 4.

For example, with respect to both cases, that is, the case in which playback of a moving picture file 360 in the playback list of FIG. 3 is requested and the case in which playback of a moving picture file 431 in the playback list of FIG. 4 is requested, the controller 10 provides an identical function to the user.

When playback of one of the series moving picture files is requested, the controller 10 according to an embodiment of the present disclosure can determine whether an auto-skipping function that automatically skips an overlapping playback section (i.e., an overlap playback section) is activated.

The auto-skipping function in an embodiment of the present disclosure can be deactivated or activated by receiving a setting value from an external server, or can be manually set by the user to be deactivated or activated.

Also, the auto-skipping function can be automatically activated when a number of moving picture files having file names that are more similar than a determined degree (i.e., series moving picture files) is greater than or equal to a predetermined number, from among moving picture files stored in the portable terminal (or included in a playback list).

For example, when a number of moving picture files having similar file names is greater than or equal to 2, the controller 10 determines that corresponding moving picture files are series moving picture files, and can perform a control to activate an auto-skipping function based on the determination.

When it is determined that the auto-skipping function is activated, the controller 10 can perform a control to play back a moving picture file of which playback is requested from a playback section excluding an overlap playback section from among an entire playback section of the requested moving picture file.

Referring to FIG. 5, for example, when the requested moving picture file is the moving picture file 431, the controller 10 performs a control to skip the opening moving picture 510a from point 511 to point 512 corresponding to an overlap playback section, and to play back the main moving picture 510 from a playback section starting from point 512. Also, when the requested moving picture file is the moving picture file 432, the controller 10 performs a control to skip the opening moving picture 520a from 521 to 522 corresponding to an overlap playback section, and to play back the main moving picture 510 from a playback section starting from point 512.

In the same manner, when the requested moving picture file is the moving picture file 433 or 434, the controller 10 performs a control to skip the opening moving picture 530a or 540a corresponding to an overlap playback section, and to play back the main moving picture 530 or 540 from a playback section starting from point 532 or point 532.

According to an embodiment that has been provided above, when a user requests playback of one of the moving picture files 431 through 434, the user can immediately view the main moving picture 510, 520, 530, or 540 without viewing an opening moving picture 510a, 520a, 530a, or 540a corresponding to an overlap playback section and thus, it can be convenient for the user.

In addition, according to a modification of an embodiment of the present disclosure, when playback of a playback section excluding an overlap playback section of a moving picture file is completed, the moving picture file being played back from the playback section (e.g., a main moving picture) excluding the overlap playback section after skipping the overlap playback section (e.g., an opening moving picture), a function that automatically terminates playback of the moving picture file is provided.

Referring to FIG. 5, for example, the controller 10 can play back the main moving picture 510 after skipping the overlap playback section 510a in response to a request for playback of the moving picture file 431, and can automatically terminate the playback of the moving picture file 431 without playing back the closing moving picture 510b when the playback of the main moving picture 510 is completed.

In this example, when the playback of the main moving picture is completed and the playback of the moving picture file is automatically terminated, the controller 10 can perform a control to automatically play back a moving picture file corresponding to a subsequent playback order of the automatically terminated moving picture file. Here, a moving picture file corresponding to the subsequent playback order of the automatically terminated moving picture file can be executed through analyzing file names of moving picture files (e.g., EP1-EP4). For example, after only the main moving picture 510 is played back and playback of the moving picture file 431 is automatically terminated, playback of the moving picture file 432 is automatically started.

Figure 6:
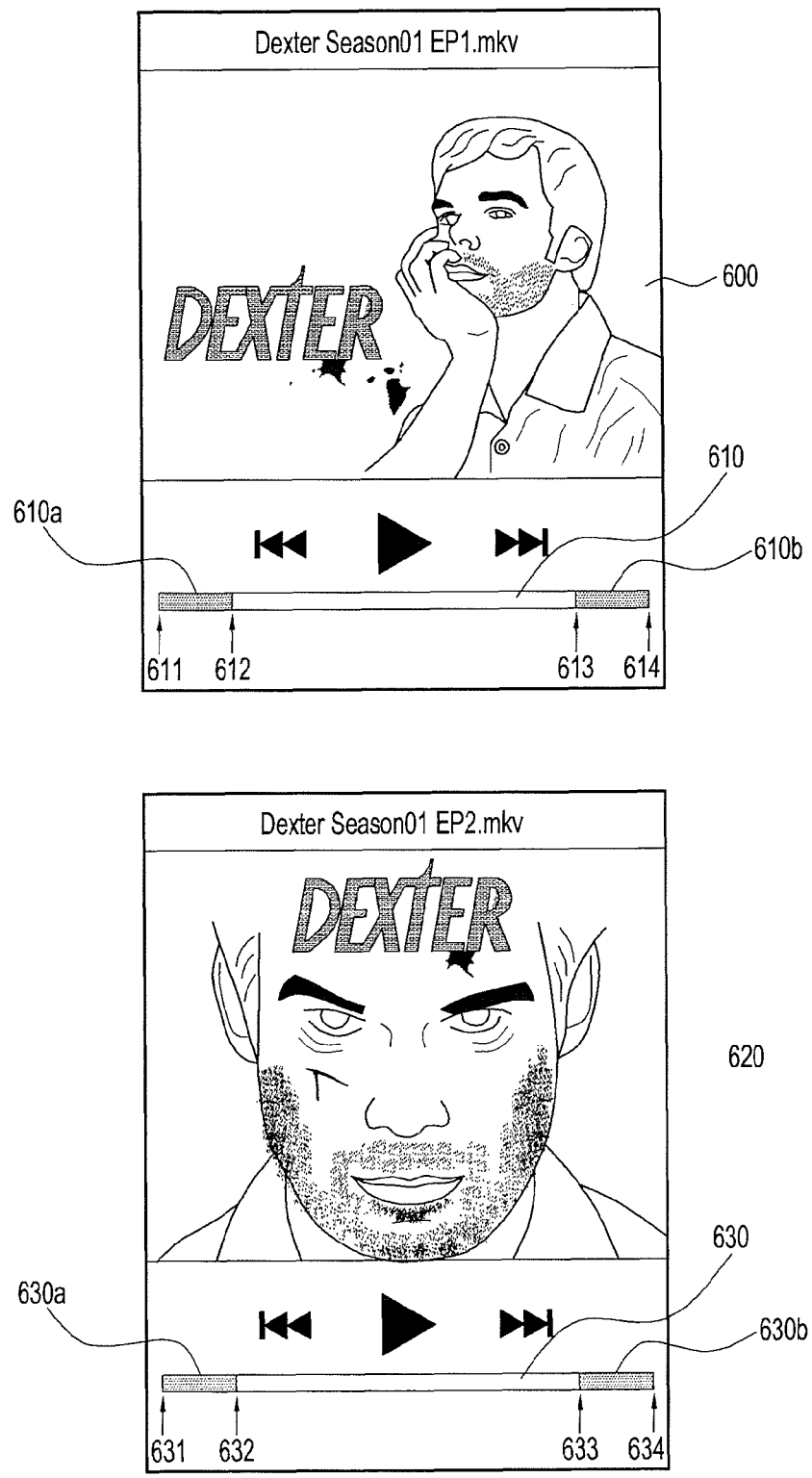
FIG. 6 is a diagram illustrating yet another example of a process of playing back a moving picture in a portable terminal according to an embodiment of the present disclosure.

Referring to FIG. 6, for example, when a main moving picture (a playback section 610) of a moving picture file named Dexter Season 01 EP1 as shown in the diagram 600 is completed, the controller 10 can perform a control to automatically start playback of a moving picture file named Dexter Season 01 EP2 and to enable the moving picture file named Dexter Season 01 EP2 to be played back from a main moving picture (a playback section 630).

According to an embodiment of the present disclosure that has been provided above, the user can automatically view a moving picture file corresponding to a subsequent playback order without viewing a closing moving picture corresponding to an overlap playback section and thus, it can be convenient for the user.

Also, a modification of an embodiment of the present disclosure can inform a user that an overlap playback section exists in a moving picture that is being played back when a moving picture file of which playback is requested is played back from a playback section (for example, a main moving picture) excluding the overlap playback section through activated auto-skipping function.

For example, the controller 10 plays back a moving picture file from a main moving picture (corresponding to a playback section from point 612 to point 613) through a display screen 600, and simultaneously, displays overlap playback sections 610a and 610b through a progress bar 610. Here, an overlap playback section 610a can correspond to an opening moving picture and an overlap playback section 610b can correspond to a closing moving picture as described in FIG. 5.

An embodiment of the present disclosure that displays an overlap playback section through a progress bar can be automatically implemented or can be manually implemented through a request of the user, and can be implemented in step S208 which will be described in the following.

In steps S207 and S208, when it is determined that the auto-skipping function is inactivated, the controller 10 performs a control to start playback of a moving picture file of which playback is requested from a playback start section, and to display the identified overlap playback section on a progress bar associated with an entire playback section of the requested moving picture file.

When it is assumed that the auto-skipping function is inactivated and playback of the moving picture file 434 of FIG. 5 is requested, the controller 10 according to an embodiment of the present disclosure performs a control to start playback of the moving picture file 434 from point 541 corresponding to a first playback section in the entire playback section from point 541 to point 544.

Playback of a moving picture file from a first playback section corresponds to the conventional art, and the conventional art is inconvenient in that a user views an overlap playback section. Therefore, according to an embodiment of the present disclosure, there is provided an additional embodiment to solve the inconvenience of the conventional art as follows.

That is, when a moving picture file is played back in a state where an auto-skipping function is inactivated, the controller 10 according to an embodiment of the present disclosure performs a control to inform the user that an overlap playback section exists in an entire playback section of the moving picture file that is being played back. Subsequently, the user selects a playback position excluding the overlap playback section from a progress bar and requests playback of the moving picture from the selected playback position, and the controller 10 performs corresponding operation.

Referring to FIG. 6, when a request for playback of a moving picture file named Dexter Season 01 EP1 or Dexter Season 01 EP2 exists and an auto-skipping function is inactivated, the controller 10 displays an overlap playback section on a corresponding moving picture like overlap playback sections 610a and 610b and 630a and 630b, so that the user can readily recognize a location of the overlap playback section in an entire playback section of the moving picture.

When the overlap playback sections 610a and 610b and 630a and 630b are displayed, the user can manually reset a moving picture playback position in a playback section (that is, a main moving picture) between point 612 and point 613 or point 632 and point 633 through inputting an input with respect to the progress bar 610 or 630.

According to an embodiment that has been described above, the user can be provided with a function of manually skipping the overlap playback section.

Although it has been described that an overlap playback section of a moving picture file is displayed through a progress bar, the overlap playback section can be displayed through a separate visual effect. For example, the overlap playback section can be displayed on a moving picture screen that is being played back in an overlay form during a predetermined period of time. However, displaying the overlap playback section through the progress bar can be useful to manually skip the overlap playback section or to recognize a location of the overlap playback section.

Also, the progress bar displaying the overlap playback section can be displayed when an overlap playback section is included in a moving picture file and playback of the moving picture file is started, and can be displayed together with the overlap playback section every time displaying the progress bar is requested.

According to the embodiments of the present disclosure that have been described above, a user can view a moving picture file by automatically skipping an overlapping moving picture such as an opening moving picture and a closing moving picture that redundantly provide identical content.

According to the embodiments of the present disclosure that have been described above, existence of an overlapping playback section that overlaps another moving picture file or a location of the overlapping section is visually displayed when a moving picture file is played back and thus, it can be convenient in that a user can skip or not skip the overlapping section based on selection of the user.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of playing a moving picture, the method comprising:
    recognizing at least one playback list including a plurality of moving picture files;
    identifying at least one first playback section in each moving picture file included in the at least one playback list by comparing each moving picture file to one another, wherein the at least one first playback section in each moving picture file includes at least one same frame as frames of another moving picture file;
    when playing at least one moving picture file in the at least one playback list, determining whether to skip the first playback section of the at least one moving picture file;
    skipping the at least one first playback section of the at least one moving picture file according to a result of the determination; and
    playing a second playback section in the at least one moving picture file, wherein the second playback portion is a remaining playback section of the at least one moving picture file, not including the at least one first playback section.

2. The method of claim 1, wherein recognizing the playback list comprises:
    generating the at least one playback list comprising the moving picture files with the file names that have higher similarities than a threshold;
    determining play settings; and
    displaying the generated at least one playback list based on the determined play settings.

3. The method of claim 1, wherein recognizing the at least one playback list comprises:
    generating the at least one playback list from the moving picture files with the file names that have higher similarities than a threshold;
    determining display settings; and
    hiding the generated play list based on the determined play settings.

4. The method of claim 1, wherein playing the second playback section in the at least one moving picture file comprises:
    receiving a request for playing back the one moving picture file included in the generated playback list; and
    playing the second playback section in the requested one moving picture file by skipping the at least one first playback section when an auto-skipping function is activated.

5. The method of claim 1, wherein playing the second playback section in the at least one moving picture file comprises:
    receiving a request for playing back the one moving picture file included in the generated playback list;
    playing the second playback section in the requested one moving picture file by skipping the at least one first playback section when an auto-skipping function is activated; and
    terminating playing the one moving picture file when playback of the second playback section is completed.

6. The method of claim 1, wherein playing the second playback section in the at least one moving picture file comprises:
    receiving a request for playing back the one moving picture file included in the generated playback list;
    playing back the requested one moving picture file from a playback section excluding the overlap playback section when the auto-skipping function is activated; and
    displaying the identified at least one first playback section on a progress bar associated with the entire play section of the requested one moving picture file.

7. The method of claim 1, wherein playing the second playback section in the at least one moving picture file comprises:
    receiving a request for playing back the one moving picture file included in the generated playback list;
    when an auto-skipping function is inactivated, playing the requested one moving picture file by including the identified playback section on a progress bar associated with an entire playback section of the requested one moving picture file.

8. The method of claim 7, further comprising:
    when a predetermined position is selected from the progress bar by a user, playing back the requested one moving picture file from a playback position corresponding to the selected position.

9. The method of claim 1, wherein the auto-skipping function is automatically activated when a number of the moving picture file, that has file names that have higher similarities than a threshold, is greater than or equal to a predetermined number.

10. The method of claim 9, wherein the predetermined number is greater than one.

11. An apparatus for playing back a moving picture, the apparatus comprising:
    a memory configured to store at least one moving picture file; and
    a controller configured to:
        perform a control to recognize at least one play list including moving picture files to identify at least one first playback section in each moving picture file included in the at least one playback list by comparing each moving picture file to one another, wherein the at least one first playback section in each moving picture file includes at least one same frame as frames of another moving picture file, when playing at least one moving picture file in the at least one playback list;
        determine whether to skip the at least one first playback section of the at least one moving picture file, and to skip the at least one first playback section of the at least one moving picture file according to as a result of the determination; and
        play a second playback section in the at least one moving picture file, wherein the second playback portion is a remaining playback section of the at least one moving picture file, not including the at least one first playback section.

12. The apparatus of claim 11, wherein the controller is configured to generate the at least one playback list including the moving picture files having file names that are more similar than a threshold from among the moving picture files stored in the memory, to determine display settings and to display the generated at least one playback list.

13. The apparatus of claim 11, wherein the controller is configured to:
    generate the at least one playback list including the moving picture files having the file names that have higher similarities than a determined from among the moving picture files stored in the memory, determine display settings, and hide the generated at least one playback list.

14. The apparatus of claim 11, wherein, when playing the one moving picture file, the controller is configured to:
play the second playback section in the one moving picture file by skipping the at least one first playback section when an auto-skipping function is activated.

15. The apparatus of claim 11, wherein, when playing the one moving picture file, the controller is configured to:
play the second playback section in the one moving picture file by skipping the at least one first playback section when an auto-skipping function is activated; and
terminate playing the one moving picture file when playing the second play section is completed.

16. The apparatus of claim 11, wherein the controller is configured to:
play the second playback section in the one moving picture file by skipping the at least one first playback section when an auto-skipping function is activated; and
display the at least one first playback section on a progress bar associated with the entire playback section of the one moving picture file.

17. The apparatus of claim 11, wherein the controller is configured to:
play the second playback section in the one moving picture file including the identified at least one first playback section on a progress bar indicating a play position when an auto-skipping function is inactivated.

18. The apparatus of claim 17, wherein, when the play position is selected from the progress bar by a user, the controller is configured to play the one moving picture corresponding to the selected play position.

19. The apparatus of claim 11, wherein the auto-skipping function is automatically activated when a number of the moving picture files, that has file names with higher similarities than a threshold, is greater than or equal to a predetermined number.

20. The apparatus of claim 19, wherein the predetermined number is greater than one.

* * * * *